(12) United States Patent
Zeng et al.

(10) Patent No.: US 12,453,266 B2
(45) Date of Patent: Oct. 21, 2025

(54) DISPLAY PANEL AND DISPLAY APPARATUS

(71) Applicant: Shanghai Tianma Micro-Electronics Co., Ltd., Shanghai (CN)

(72) Inventors: Yang Zeng, Shanghai (CN); Shihao Tang, Shanghai (CN); Yaodong Wu, Shanghai (CN); Yanbo Lou, Shanghai (CN); Shengtao Zhu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 564 days.

(21) Appl. No.: 17/850,224

(22) Filed: Jun. 27, 2022

(65) Prior Publication Data

US 2022/0328797 A1    Oct. 13, 2022

(30) Foreign Application Priority Data

Mar. 30, 2022    (CN) .......................... 202210333950.0

(51) Int. Cl.
*H10K 59/38*    (2023.01)
*G06V 40/13*    (2022.01)
(Continued)

(52) U.S. Cl.
CPC .......... *H10K 59/38* (2023.02); *G06V 40/1318* (2022.01); *H10K 59/122* (2023.02);
(Continued)

(58) Field of Classification Search
CPC ................. H04N 13/243; H04N 25/70; H01L 27/14645; H01L 27/14625; H01L 27/14627; H01L 27/14678; H01L 27/1463; H01L 27/14621; H01L 27/14623; H01L 27/14609; H01L 27/1462; H01L 27/146; H01L 31/153; H01L 27/156;
(Continued)

(56) References Cited

U.S. PATENT DOCUMENTS

| | | | |
|---|---|---|---|
| 11,783,616 B2 * | 10/2023 | Li .................... | G06V 40/1329 382/124 |
| 2014/0327966 A1 * | 11/2014 | Tani .................. | G02B 1/118 359/586 |
| 2015/0062497 A1 * | 3/2015 | Nam ................. | G02F 1/133536 349/96 |
| 2017/0261808 A1 * | 9/2017 | Sakai ................ | G02F 1/133514 |

(Continued)

FOREIGN PATENT DOCUMENTS

| CN | 111312792 A | 6/2020 |
|---|---|---|
| CN | 112034650 A | 12/2020 |

(Continued)

OTHER PUBLICATIONS

Chinese Office Action mailed Oct. 27, 2023, issued in related Chinese Application No. 202210333950.0 filed Mar. 30, 2022, 13 pages.

*Primary Examiner* — Mouloucoulaye Inoussa
(74) *Attorney, Agent, or Firm* — Christensen O'Connor Johnson Kindness PLLC

(57) ABSTRACT

A display panel and a display apparatus are provided. The display panel includes an anti-reflection film located at a light-exiting side of the display panel. A reflectivity of the anti-reflection film for light having a first wavelength is smaller than a reflectivity of the anti-reflection film for light having a second wavelength, and the first wavelength is different from the second wavelength.

19 Claims, 5 Drawing Sheets

(51) Int. Cl.
  *G09G 3/3225* (2016.01)
  *H10K 59/122* (2023.01)
  *H10K 59/65* (2023.01)
  *H10K 59/80* (2023.01)

(52) U.S. Cl.
  CPC ....... *H10K 59/8791* (2023.02); *G09G 3/3225* (2013.01); *G09G 2300/0842* (2013.01); *G09G 2320/02* (2013.01); *H10K 59/65* (2023.02)

(58) Field of Classification Search
  CPC ............. G06V 10/147; G06V 40/1388; G06V 40/145; G06V 40/1312; G06V 10/143; G06V 40/1318; H10K 50/86; H10K 59/65; H10K 59/8791; H10K 59/122; H10K 59/38; H10K 50/865; H10K 59/8792; H10K 59/121; H10K 59/60; H10K 50/80; H10K 59/126; H10K 59/12; H10K 59/873; H10K 50/844; H10K 59/40; G09G 3/3225; G09G 2320/02; G09G 2300/0842; G02B 5/18; G02B 5/32; G02B 1/118; G02B 27/4205; G02B 6/08; G02B 6/0053; G02B 19/0009; G02B 6/0088; G02B 3/0056; G02B 5/005; G02B 5/3033; G06F 3/0412; G02F 1/133514; G02F 1/133555; G02F 1/13363; G02F 1/133536; G02F 1/133638; G02F 2413/05; G02F 1/133512; G02F 1/133302; G02F 1/133531; G02F 1/133541; G02F 1/1368; G02F 1/13439; G02F 1/134309; G02F 1/133345; G02F 2413/01; G02F 2203/02; G02F 2203/01; Y02E 10/549

See application file for complete search history.

(56) References Cited

U.S. PATENT DOCUMENTS

| | | | |
|---|---|---|---|
| 2018/0068166 A1* | 3/2018 | Zeng | G02F 1/1333 |
| 2018/0364521 A1* | 12/2018 | Baek | G02B 1/113 |
| 2019/0050621 A1* | 2/2019 | Xu | G06V 40/1318 |
| 2019/0095674 A1* | 3/2019 | Ko | H01L 31/153 |
| 2019/0213379 A1* | 7/2019 | Zhao | H10K 50/865 |
| 2019/0237521 A1* | 8/2019 | Ju | H10K 59/8792 |
| 2019/0354789 A1* | 11/2019 | Gu | G06V 40/1318 |
| 2020/0082144 A1* | 3/2020 | Lin | G02F 1/133514 |
| 2020/0172443 A1* | 6/2020 | Kawamura | H01L 27/14612 |
| 2020/0212135 A1* | 7/2020 | Zhang | H10K 59/40 |
| 2020/0241173 A1* | 7/2020 | Byun | G02B 1/11 |
| 2020/0403168 A1* | 12/2020 | Li | H10K 59/123 |
| 2021/0066648 A1* | 3/2021 | Chung | H10K 59/122 |
| 2021/0126035 A1* | 4/2021 | Roh | G02B 5/1876 |
| 2021/0181860 A1* | 6/2021 | Ye | G06F 3/0202 |
| 2021/0184160 A1* | 6/2021 | Li | H10K 50/115 |
| 2021/0226096 A1* | 7/2021 | Zhang | G02B 5/26 |
| 2021/0296619 A1* | 9/2021 | Wang | H10K 59/35 |
| 2021/0389630 A1* | 12/2021 | Soda | G02F 1/133562 |
| 2022/0035207 A1* | 2/2022 | Meng | G02F 1/134345 |
| 2022/0039697 A1* | 2/2022 | Higano | G02B 6/005 |
| 2022/0075981 A1* | 3/2022 | Park | G06V 40/1318 |
| 2022/0137268 A1* | 5/2022 | Yun | H01L 27/14625 |
| | | | 348/302 |
| 2023/0044716 A1* | 2/2023 | Han | G02B 1/118 |
| 2023/0141768 A1* | 5/2023 | Wang | G02F 1/13338 |
| | | | 257/40 |
| 2023/0238416 A1* | 7/2023 | Noudo | H04N 13/243 |
| | | | 257/291 |
| 2024/0120358 A1* | 4/2024 | Banerjee | H01L 27/1462 |

FOREIGN PATENT DOCUMENTS

| | | |
|---|---|---|
| CN | 215771152 U | 2/2022 |
| WO | 2020146320 A1 | 7/2020 |

* cited by examiner

DISPLAY PANEL AND DISPLAY APPARATUS

CROSS-REFERENCE TO RELATED APPLICATION

The present disclosure claims priority to Chinese Patent Application No. 202210333950.0, filed on Mar. 30, 2022, the content of which is incorporated herein by reference in its entirety.

TECHNICAL FIELD

The present disclosure relates to the field of display technologies, and, particularly, relates to a display panel and a display apparatus.

BACKGROUND

In recent years, with the continuous development of science and technology, more and more electronic devices with a display function have been widely used in people's daily life and work, which has brought great convenience to people's daily life and work and have become indispensable tools. Moreover, to improve user's experience, in addition to displaying images on the display panel and exerting the display function of the display panel, there are more and more display devices with non-display functions such as fingerprint recognition or still/video image capture.

However, in the related art, display panels cannot incorporate non-display functions without sacrificing display performance.

SUMMARY

In a first aspect, the present disclosure provides a display panel. The display panel includes an anti-reflection film located at a light-exiting side of the display panel. A reflectivity of the anti-reflection film for light having a first wavelength is smaller than a reflectivity of the anti-reflection film for light having a second wavelength, and the first wavelength is different from the second wavelength.

In a second aspect, the present disclosure provides a display apparatus. The display apparatus includes the display panel described in the first aspect.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing embodiments, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that although the terms 'first' and 'second' may be used in the present disclosure to describe wavelengths. These wavelengths should not be limited to these terms. These terms are only configured to distinguish wavelengths from each other. For example, without departing from the scope of the embodiments of the present disclosure, the first wavelength can also be referred to as the second wavelength, and similarly, the second wavelength can also be referred to as the first wavelength.

Figure 1:
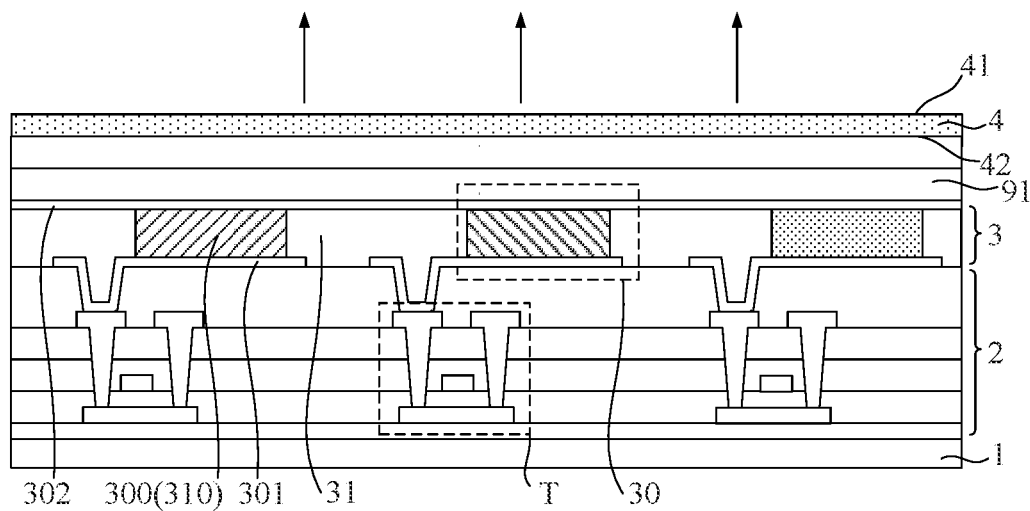
FIG. 1 is a cross-sectional view of a display panel according to some embodiments of the present disclosure.

Some embodiments of the present disclosure provide a display panel. FIG. 1 is a cross-sectional view of a display panel according to some embodiments of the present disclosure. As shown in FIG. 1, the display panel includes a substrate 1, an array layer 2, and a display layer 3, and anti-reflection film 4. In a direction perpendicular to a plane of the substrate 1, the array layer 2 is located at a side of the substrate 1, the display layer 3 is located at a side of the array layer 2 facing away from the substrate 1, and the anti-reflection film 4 is located at a side of the display layer 3 facing away from the substrate 1.

In some embodiments, the display panel can be a liquid crystal display panel (LCD), or can also be a self-light-emitting display panel using a self-light-emitting technology, such as an organic light-emitting diode (OLED) display panel or quantum dot light-emitting diode (QLED) display panel, and so on.

When the self-light-emitting technology is adopted, exemplarily, as shown in FIG. 1, in some embodiments of the present disclosure, multiple first light-emitting elements 30 can be arranged in the display layer 3. FIG. 1 exemplarily illustrates three first light-emitting elements 30. In some embodiments of the present disclosure, the first light-emitting element 30 can be a white light-emitting element that emits white light. In some embodiments of the present disclosure, the first light-emitting element 30 can include a first-color light-emitting unit that emits light of a first color, a second-color light-emitting unit that emits light of a second color, and a third-color light-emitting unit that emits light of a third color. The first color, the second color, and the third color are different from each other. For example, the first color can be red, the second color can be green, and the third color can be blue.

Referring to FIG. 1, the first light-emitting element 30 includes a first electrode 301, a first light-emitting layer 300, and a second electrode 302 that are stacked together. The first electrode 301 is located at a side of the first light-emitting layer 300 facing the substrate 1, and the second electrode 302 is located at a side of the first light-emitting layer 300 facing away from the substrate 1. As shown in FIG. 1, the display layer 3 can include a pixel definition layer 31. The pixel definition layer 31 includes multiple first openings 310. The first opening 310 exposes at least a portion of the first electrode 301. The first light-emitting layer 300 is located in the first opening 310.

In some embodiments of the present disclosure, the array layer 2 includes transistors and storage capacitors. Some transistors and some storage capacitors form a first pixel driving circuit. The first pixel driving circuit is electrically connected to the first light-emitting element 30 to control the operation of the first light-emitting element 30. Some other transistors can form a peripheral circuit such as a scanning driver circuit. FIG. 1 exemplarily illustrates only one transistor T directly connected to the first light-emitting element 30.

In the embodiments of the present disclosure, the anti-reflection film 4 is located at the light-exiting side of the display panel. A direction indicated by an arrow in FIG. 1 is a light-exiting direction of the display panel. In some embodiments of the present disclosure, a reflectivity R1 of the anti-reflection film 4 for the light having the first wavelength $\lambda 1$ and a reflectivity R2 of the anti-reflection film 4 for the light having the second wavelength $\lambda 2$ satisfy R1<R2, and the first wavelength $\lambda 1$ is different from the second wavelength $\lambda 2$.

As shown in FIG. 1, the anti-reflection film 4 includes a first surface 41 and a second surface 42 that are opposite to each other along a direction perpendicular to the plane of the substrate 1. The first surface 41 is located at a side of the second surface 42 facing away from the substrate 1. Taking a light source that emits light having the first wavelength $\lambda 1$ as a first light source as an example, after the light having the first wavelength $\lambda 1$ emitted from the first light source is incident to the anti-reflection film 4, the light will be reflected when reaching the first surface 41 and the second surface 42 of the anti-reflection film 4. For example, the light having the first wavelength $\lambda 1$ can be any one of light in the ambient light outside the display panel. When the ambient light is incident to the display panel, the ambient light will be reflected at both the first surface 41 and the second surface 42 of the anti-reflection film 4. In some embodiments of the present disclosure, the anti-reflection film 4 can be set to cause interference cancellation between light having the first wavelength $\lambda 1$ reflected by the first surface 41 and light having the first wavelength $\lambda 1$ reflected by the second surface 42, so as to reduce the intensity of the light having the first wavelength $\lambda 1$ that is reflected by the anti-reflection film 4 and propagates towards a side close to the first light source.

Exemplarily, in some embodiments of the present disclosure, the first wavelength $\lambda 1$ can satisfy: 400 nm<$\lambda 1$<700 nm. That is, in some embodiments of the present disclosure, the light having the first wavelength $\lambda 1$ can be one of the visible lights. In the embodiments of the present disclosure, by making the anti-reflection film 4 have a relatively low reflectivity for the visible light, and when the display panel is operating, after the visible light in the environment is incident to the anti-reflection film 4, the intensity of the visible light reflected by the anti-reflection film 4 will be reduced. In this way, when the display panel is displaying images, a contrast of the display screen can be improved, and the visual effect of the display panel can be improved.

In some embodiments of the present disclosure, the first wavelength $\lambda 1$ can be 550 nm. That is, the first wavelength $\lambda 1$ can be the wavelength of the green light, which is sensitive to human eyes and is dominant in ambient light, so that the display effect of the display panel viewed by human eyes can be improved.

Taking a light source that emits the light having the second wavelength $\lambda 2$ as a second light source as an example, after the light having the second wavelength $\lambda 2$ emitted from the second light source is incident to the anti-reflection film 4, the light is reflected at the first surface 41 and the second surface 42 of the anti-reflection film 4. In the embodiments of the present disclosure, the anti-reflection film 4 can be set so that the light having the second wavelength $\lambda 2$ reflected by the first surface 41 and the light having the second wavelength $\lambda 2$ reflected by the second surface 42 do not satisfy the interference cancellation condition, thereby reducing the effect of the anti-reflection film 4 on the light having the second wavelength $\lambda 2$. In this way, the light having the second wavelength $\lambda 2$ reflected by the anti-reflection film 4 and propagating towards the second light source has a relatively large intensity. Exemplarily, in some embodiments of the present disclosure, a sensor utilizing the light having the second wavelength $\lambda 2$ can be provided in the display panel. In this way, while improving the contrast of the image displayed on the display panel, it can also ensure that the sensor can receive the light having the second wavelength $\lambda 2$ having a relatively large intensity when the sensor is operating, thereby reducing the effect of the anti-reflection film 4 on the operating performance of the sensor.

In the embodiments of the present disclosure, the anti-reflection film 4 is provided at the light-exiting side of the display panel, and the reflectivity of the anti-reflection film 4 for the light having the first wavelength 2J is smaller than the reflectivity of the anti-reflection film 4 for the light having the second wavelength $\lambda 2$. In this way, the anti-reflection film 4 can have different influence on the light having the first wavelength $\lambda 1$, and the intensity of the light having the second wavelength $\lambda 2$ reflected by the anti-reflection film 4 has a relatively high intensity while the light having the first wavelength $\lambda 1$ reflected by the anti-reflection film 4 is reduced. Therefore, the display panel can have multiple functions. For example, one of the functions can be realized by reducing the intensity of the light having the first wavelength $\lambda 1$ reflected by the display panel, and another one of the functions can be realized by increasing the intensity of the light having the second wavelength $\lambda 2$ reflected by the display panel.

Figure 2:
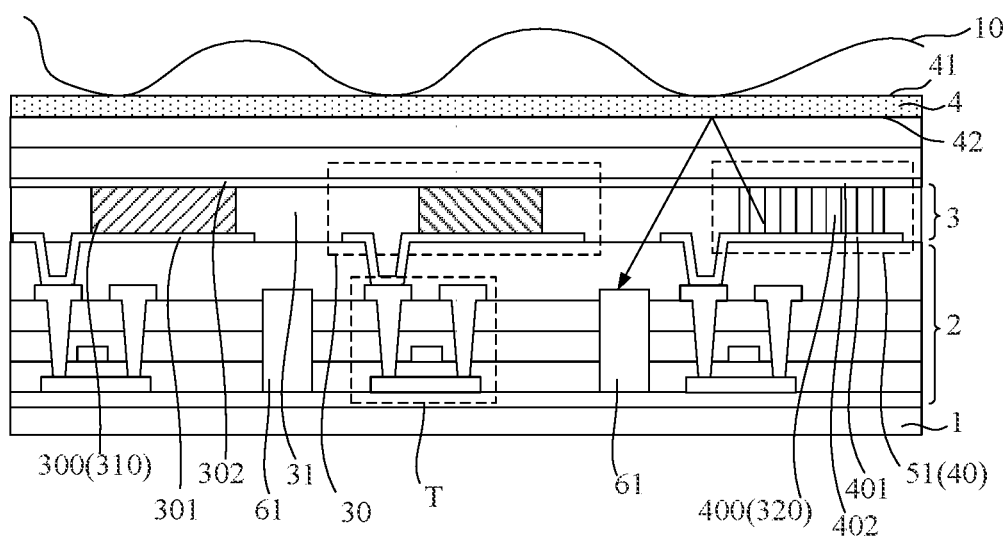
FIG. 2 is a cross-sectional view of another display panel according to some embodiments of the present disclosure.

Exemplarily, some embodiments of the present disclosure provide a display panel having a fingerprint recognition function. FIG. 2 is a cross-sectional view of another display panel according to some embodiments of the present disclosure. As shown in FIG. 2, the display panel can include a first fingerprint recognition light source 51 and a first fingerprint recognition module 61. The first fingerprint recognition light source 51 is configured to emit the light having the second wavelength λ2. The first fingerprint recognition module 61 is configured to receive the light having the second wavelength λ2. Exemplarily, the first fingerprint recognition module 61 includes an element with a photosensitive function, such as a photosensitive diode.

When the display panel performs fingerprint recognition, a finger 10 can press on the first surface 41 of the anti-reflection film 4. The first fingerprint recognition light source 51 emits light having the second wavelength λ2. The intensity of the light having the second wavelength λ2 reflected by the anti-reflection film 4 at a position where a fingerprint valley is in contact with the anti-reflection film 4, is different from the intensity of the light having the second wavelength λ2 reflected by the anti-reflection film 4 at a position where a fingerprint ridge is in contact with the anti-reflection film 4, and the light having the second wavelength λ2 reflected by the finger 10 enters the first fingerprint recognition module 61, and then the first fingerprint recognition module 61 can identify the fingerprint valley and the fingerprint ridge according to the intensity of the received reflection light, thereby realizing fingerprint recognition.

In the embodiments of the present disclosure, by selecting the light having the second wavelength λ2 as the light source for fingerprint recognition, the anti-reflection film 4 has less influence on the light having the second wavelength λ2 emitted from the first fingerprint recognition light source 51 during fingerprint recognition. Therefore, the difference between the intensity of the reflection light entering the first fingerprint recognition module 61 at the fingerprint valley and the fingerprint ridge can be guaranteed, and sensitivity and accuracy of fingerprint recognition can be reached while the anti-reflection film 4 reduces the intensity of the reflected light having the first wavelength λ1.

In some embodiments of the present disclosure, a refractive index n of the anti-reflection film 4 and a thickness d of the anti-reflection film 4 can satisfy:

$$n \times d = \lambda 1 \times (\frac{1}{4} + k/2) \quad (1),$$

where k is an integer. In this way, the first wavelength λ1 can be set as a central wavelength of the anti-reflection film 4, that is, the light having the first wavelength λ1 is reflected by the anti-reflection film 4 to have a minimum intensity.

In some embodiments of the present disclosure, R1 and R2 can satisfy:

$$(R2-R1)/R1 \geqslant 5 \quad (2).$$

In this way, it can be achieved that the reflectivity of the anti-reflection film 4 for the light having the first wavelength λ1 is significantly different from the reflectivity of the anti-reflection film 4 for the light having the second wavelength λ2, the reflectivity of the anti-reflection film 4 for the light having the first wavelength λ1 is reduced to improve the visual effect of the display panel, and the influence of the anti-reflection film 4 on the light having the second wavelength λ2 is reduced so that the display panel can better realize a function of utilizing the light having the second wavelength λ2.

When designing the anti-reflection film 4, some embodiments of the present disclosure can determine the first wavelength λ1 according to the application scenario of the display panel, that is, determining the central wavelength of the anti-reflection film 4. The thickness d and the refractive index n of the antireflection film 4 are determined according to the above formula (1). After the thickness d and the refractive index n of the anti-reflection film 4 are determined, a reflectivity curve of the anti-reflection film 4 can be obtained. After that, in some embodiments of the present disclosure, the second wavelength λ2 that satisfies the above formula (2) can be selected according to the reflectivity curve of the anti-reflection film 4.

In some embodiments of the present disclosure, the second wavelength λ2 can satisfy: λ2 ⩾ 700 nm, or λ2 ⩽ 5400 nm.

Exemplarily, a material made of the anti-reflection film 4 includes metal fluoride. For example, in some embodiments of the present disclosure, the anti-reflection film 4 can be made of calcium fluoride or magnesium fluoride.

Figure 3:
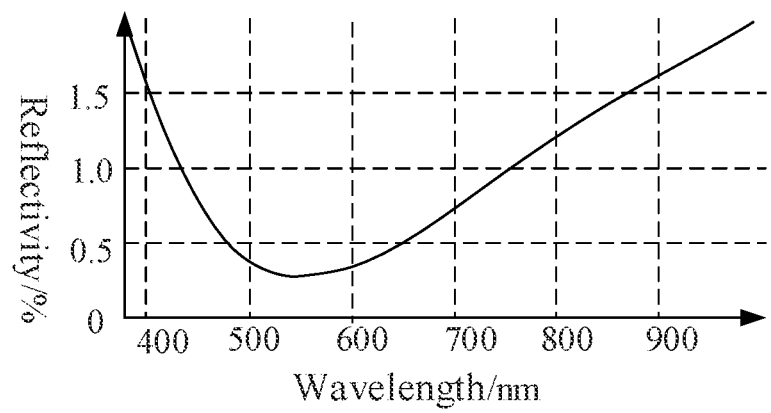
FIG. 3 is a schematic diagram of a reflectivity curve of an anti-reflection film according to some embodiments of the present disclosure.

FIG. 3 is a schematic diagram of a reflectivity curve of an anti-reflection film according to some embodiments of the present disclosure. As shown in FIG. 3, the thickness d of the anti-reflection film is 106 nm, and the refractive index n of the anti-reflection film is 1.3. It can be seen that the reflectivity of the anti-reflection film for light having a wavelength ranging from 430 nm and 760 nm is smaller than 1%, and the reflectivity of the anti-reflection film for light having a wavelength of 550 nm is minimum, reaching 0.28%. The reflectivity of the anti-reflection film for light having a wavelength greater than or equal to 875 nm is greater than 1.5%. For example, when using the anti-reflection film shown in FIG. 3, in some embodiments of the present disclosure, the first wavelength λ1 can be set to 550 nm, and the second wavelength λ2 can be set to 940 nm.

Figure 4:
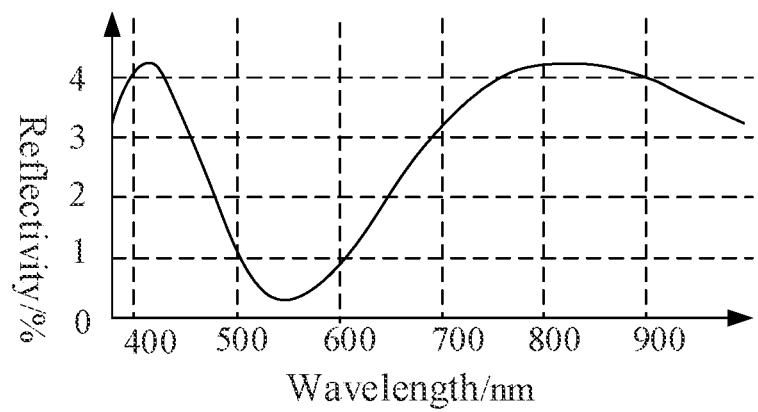
FIG. 4 is a schematic diagram of a reflectivity curve of another anti-reflection film according to some embodiments of the present disclosure.

FIG. 4 is a schematic diagram of a reflectivity curve of another anti-reflection film according to some embodiments of the present disclosure. As shown in FIG. 4, the thickness d of the anti-reflection film is 317 nm, and the refractive index n of the anti-reflection film is 1.3. It can be seen that the reflectivity of the anti-reflection film for light having a wavelength ranging from 505 nm and 608 nm is smaller than 1%, and the reflectivity of the anti-reflection film for light having a wavelength of 550 nm is the minimum, reaching 0.28%. The reflectivity for light having a wavelength greater than 690 nm is greater than 3%. For example, when using the anti-reflection film shown in FIG. 4, in some embodiments of the present disclosure, the first wavelength λ1 can be set to 550 nm, and the second wavelength λ2 can be set to 940 nm.

In some embodiments, the first fingerprint recognition light source 51 can be provided on the display layer 3. As shown in FIG. 2, the first fingerprint recognition light source 51 can include a second light-emitting element 40, and the second light-emitting element 40 includes a second light-emitting layer 400. The pixel definition layer 31 can include a second opening 320. The second light-emitting layer 400 is located in the second opening 320 of the pixel definition layer 31.

Exemplarily, as shown in FIG. 2, the second light-emitting element 40 includes a third electrode 401 and a fourth electrode 402. The second light-emitting layer 400 is located between the third electrode 401 and the fourth electrode 402. The third electrode 401 is located at a side of the second light-emitting layer 400 facing the substrate 1, and the fourth electrode 402 is located at a side of the second light-emitting layer 400 facing away from the substrate 1. The second opening 320 exposes at least a portion of the third electrode 401. When performing fingerprint recognition, under a difference between a voltage of the third electrode 401 and a voltage of the fourth electrode 402, the second light-emitting layer 400 can emit the light having the second wavelength λ2. Exemplarily, the second light-emitting layer 400 can be configured to emit infrared light or ultraviolet light.

In some embodiments of the present disclosure, the third electrode 401 of the second light-emitting element 40 and the first electrode 301 of the first light-emitting element 30 can be provided in a same layer, and the fourth electrode 402 of the second light-emitting element 40 and the second electrode 302 of the first light-emitting element 30 is provided in a same layer, which simplify the manufacturing process of the display panel. In some embodiments, as shown in FIG. 2, the third electrode 401 and the first electrode 301 can be insulated from each other, and the fourth electrode 402 and the second electrode 302 can be connected to each other.

Exemplarily, the display panel can include a second pixel driving circuit electrically connected to the second light-emitting element 40. The second pixel driving circuit includes multiple transistors. In some embodiments of the present disclosure, the number of transistors in the first pixel driving circuit is greater than or equal to the number of transistors in the second pixel driving circuit.

Figure 5:
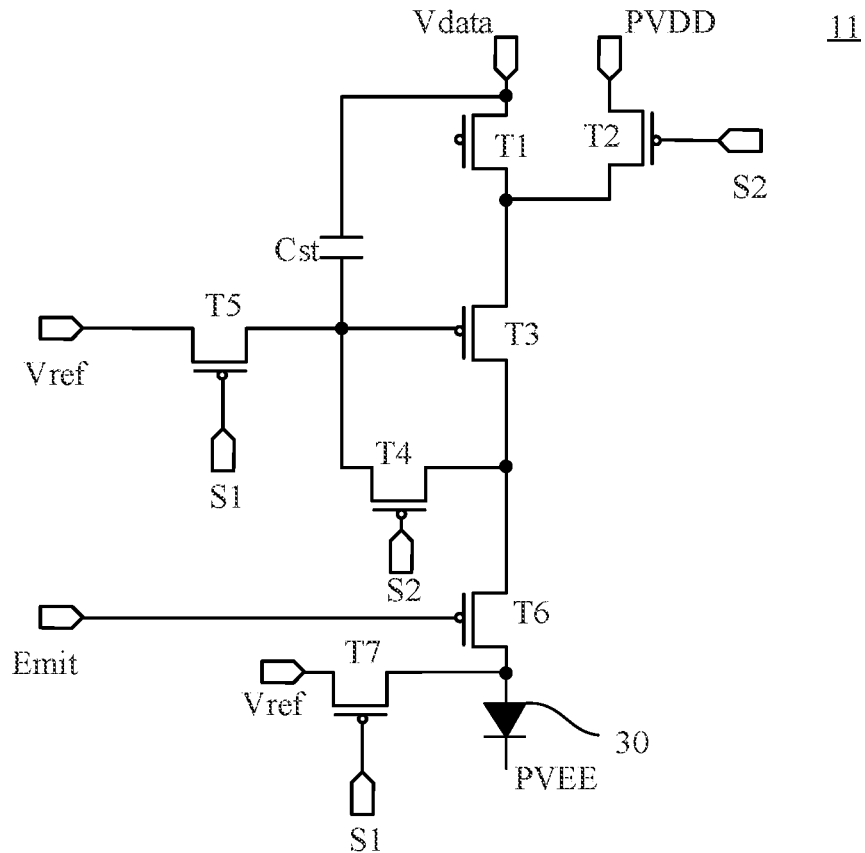
FIG. 5 is a schematic diagram of a first pixel driving circuit according to some embodiments of the present disclosure.
Figure 6:
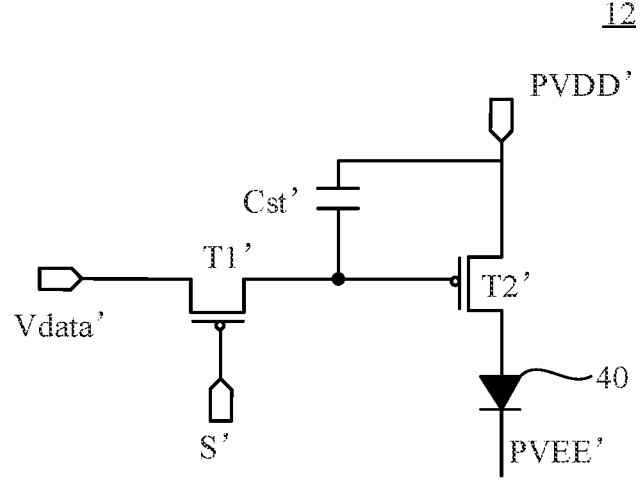
FIG. 6 is a schematic diagram of a second pixel driving circuit according to some embodiments of the present disclosure.

FIG. 5 is a schematic diagram of a first pixel driving circuit according to some embodiments of the present disclosure, and FIG. 6 is a schematic diagram of a second pixel driving circuit according to some embodiments of the present disclosure. In some embodiments, as shown in FIG. 5 and FIG. 6, the first pixel driving circuit 11 can have a 7T1C structure including seven transistors and one capacitor Cst, and the second pixel driving circuit 12 can have a 2T1C structure including two transistors and one capacitor Cst'. The seven transistors are T1, T2, T3, T4, T5, T6, and T7, respectively. As shown in FIG. 6, the two transistors are T1' and T2', respectively. The first pixel driving circuit 11 is electrically connected to a first power supply voltage terminal PVDD, a second power supply voltage terminal PVEE, a first data signal terminal Vdata, a reset signal terminal Vref, a first scanning signal terminal S1, a second scanning signal terminal S2, and a light-emitting control signal terminal Emit. The second pixel driving circuit 12 is electrically connected to a third power supply voltage terminal PVDD', a fourth power supply voltage terminal PVEE', a second data signal terminal Vdata', and a scanning control signal terminal S'.

In the embodiments of the present disclosure, a large number of transistors are provided in the first pixel driving circuit 11, and thus the light-emitting effect of the first light-emitting element 30 can be achieved through the cooperation of the transistors. Meanwhile, in the embodiments of the present disclosure, the number of the transistors in the second pixel driving circuit 12 is smaller than the number of transistors in the first pixel driving circuit 11, the area occupied by the second pixel driving circuits 12 while ensuring the normal light emitting of the second light-emitting element 40, which can leave enough space in the display panel to accommodate more first pixel driving circuits 11 to provide a relatively high resolution of the display panel and improve the display effect of the display panel.

In some embodiments of the present disclosure, a density of the first light-emitting layer 300 is greater than or equal to a density of the second light-emitting layer 400. That is, within a same area, in some embodiments of the present disclosure, the number of the first light-emitting layers 300 is greater than the number of the second light-emitting layers 400. With such a configuration, the resolution of the display panel and the display effect of the display panel can be achieved.

In some embodiments of the present disclosure, the first fingerprint recognition light source 51 can be provided on a side of the first light-emitting element 30 facing the anti-reflection film 4. With such a configuration, the first fingerprint recognition light source 51 can be closer to the anti-reflection film 4, and when the fingerprint recognition is performed, the light having the second wavelength λ2 emitted from the first fingerprint recognition light source 51 can pass through less layers when being incident to the finger, which is beneficial to ensure the intensity of the light having the second wavelength λ2 incident to the finger.

In some embodiments of the present disclosure, the first fingerprint recognition light source 51 can be provided on a side of the first light-emitting element 30 facing away from the anti-reflection film 4.

In some embodiments, as shown in FIG. 2, the first fingerprint recognition module 61 can be integrated in the array layer 2. The first fingerprint recognition module 61 can include a photodiode as well as other transistors configured to control the operation of the photodiode. The transistors in the first fingerprint recognition module 61 can be formed synchronously with the transistors in the first pixel driving circuit 11, so as to simplify the manufacturing process of the display panel.

Exemplarily, in some embodiments of the present disclosure, an orthographic projection of the photodiode in the first fingerprint recognition module 61 on a plane of the substrate 1 can be located between two adjacent first light-emitting elements 30 to avoid that the light having the second wavelength λ2 reflected by the finger is blocked by the first light-emitting element 30 during emitting to the first fingerprint recognition module 61, so as to achieve the normal operation of fingerprint recognition.

It should be noted that, in order to make the drawing more concise, only the position of the first fingerprint recognition module 61 is shown in FIG. 2, and the structure of the first fingerprint recognition module 61 is not shown. The structure of the first fingerprint recognition module 61 can be designed according to different design requirements.

Figure 7:
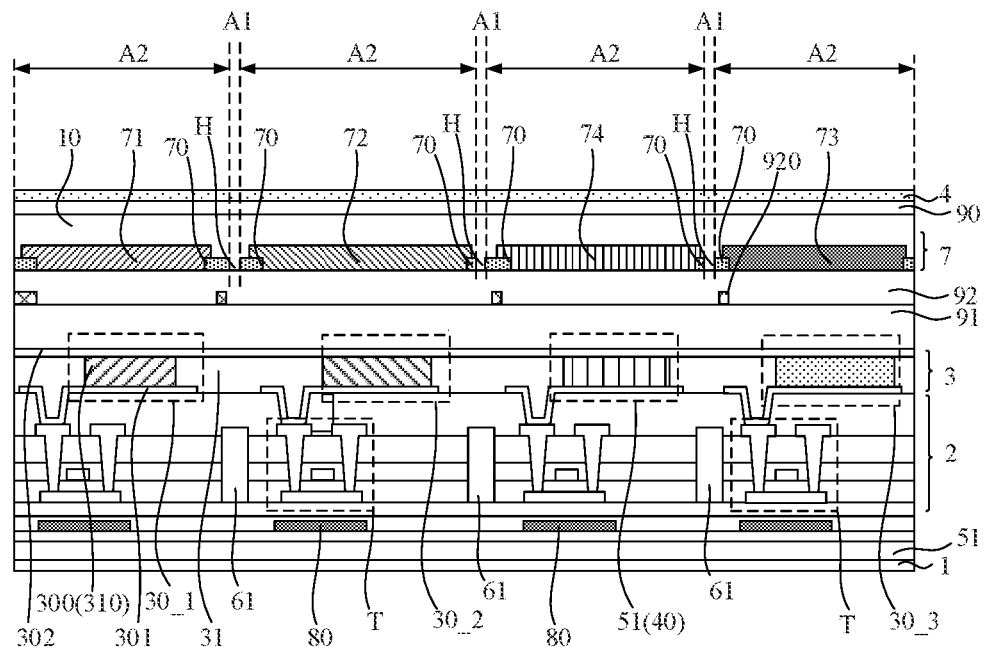
FIG. 7 is a cross-sectional view of another display panel according to some embodiments of the present disclosure.

FIG. 7 is a cross-sectional view of another display panel according to some embodiments of the present disclosure. In some embodiments, as shown in FIG. 7, the display panel includes a filtering layer 7. The filtering layer 7 is located between the display layer 3 and the anti-reflection film 4 along a direction perpendicular to the plane of the substrate 1. Exemplarily, the filtering layer 7 can be located between the anti-reflection film 4 and the first fingerprint recognition module 61.

The filtering layer 7 can include a first color filter unit 71, a second color filter unit 72, and a third color filter unit 73. The first color filter unit 71, the second color filter unit 72, and the third color filter unit 73 can transmit light of different colors, respectively. Exemplarily, when the first light-emitting element 30 includes a first-color light-emitting unit 30_1, a second-color light-emitting unit 30_2, and a third-color light-emitting unit 30_3, a light-transmitting wavelength band of the first color filter unit 71 overlaps with a light-emitting wavelength band of the first-color light-emitting unit 30_1, a light-transmitting wavelength band of the second color filter unit 72 overlaps with a light-emitting wavelength band of the second-color light-emitting unit 30_2, and a light-transmitting wavelength band of the third color filter unit 73 overlaps with the light-emitting wavelength band of the third-color light-emitting unit 30_3. In some embodiments of the present disclosure, along the direction perpendicular to the plane of the substrate 1, the first color filter unit 71 can overlap with the first-color light-emitting unit 30_1, the second color filter unit 72 can overlap with the second-color light-emitting unit 30_2, and the third color filter unit 53 can overlap with the third-color light-emitting unit 30_3. When the display panel is displaying images, light emitted from the first-color light-emitting unit 30_1 can be emitted through the first color filter unit 71, light emitted from the second-color light-emitting unit 30_2 can be emitted through the second color filter unit 72, and the third-color light-emitting unit 30_3 can be emitted through the third color filter unit 73, which can improve the color purity of light of various colors exiting from the display panel.

Since the first color filter unit 71, the second color filter unit 72, and the third color filter unit 73 each can only transmit light of a certain wavelength band and absorb and filter light of other wavelength bands. In this way, for the visible light inside the display panel and the visible light reflected by reflective structures such as metal electrodes inside the display panel, the first color filter unit 71, the second color filter unit 72, and the third color filter unit 73 are provided to reduce the intensity of the reflected ambient light emitted from the display panel, which reduces the overall reflectivity of the display panel. In this way, there is no need to provide additional polarizers in the display panel, which is beneficial to reduce the thickness of the display panel, improve the flexibility of the display panel, improve the bending resistance of the display panel, and reduce the cost of the display panel. Compared with a display panel including a polarizer, the display panel including no polarizer can improve the light-exiting rate of the display panel and the brightness of the display panel, and reduce the power consumption. In the embodiments of the present disclosure, the anti-reflection film 4 and the filtering layer 7 are arranged to match each other, so that the anti-reflection film 4 purifies the light received by the first fingerprint recognition module 61 and light other than the fingerprint recognition light source, such as ambient light, does not affect the first fingerprint recognition module 61. Meanwhile, the anti-reflection film 4 can also be configured to improve the chromatic dispersion of reflection light, which is caused by providing the filtering layer 7, and thus the display effect of the display panel is improved, so that the display panel has both good display performance and fingerprint recognition performance.

In some embodiments, as shown in FIG. 7, the filtering layer 7 includes a fourth color filter unit 74. The fourth color filter unit 74 overlaps with the second light-emitting element 40 along the direction perpendicular to the plane of the display panel. The transmittance of the fourth color filter unit 74 for the light having the second wavelength $\lambda 2$ is greater than the transmittance of the fourth color filter unit 74 for the first wavelength $\lambda 1$. With such a configuration, the loss of the light having the second wavelength $\lambda 2$ emitted from the second light-emitting element 40 during the process where the light having the second wavelength $\lambda 2$ emitted from the second light-emitting element 40 is incident to the anti-reflection film 4, can be reduced.

Exemplarily, as shown in FIG. 7, the filtering layer 7 includes multiple first light-shielding units 70. Along a direction parallel to the plane of the substrate 1, the first light-shielding unit 70 is located between the color filter units of different colors. For example, a part of the first light-shielding unit 70 can be located between the first color filter unit 71 and the second color filter unit 72. On the one hand, the first light-shielding unit 70 is provided to avoid crosstalk between light of different colors; on the other hand, the first light-shielding unit 70 can absorb light, such as the visible light inside the display panel and the visible light reflected by reflective structures such as metal electrodes inside the display panel, thereby reducing the intensity of the reflected ambient light emitted from the display panel and being beneficial to reduce the overall reflectivity of the display panel.

In some embodiments, as shown in FIG. 7, the filtering layer 7 includes a first region A1 and a second region A2, and the transmittance of a part of the filtering layer 7 located in the first region A1 for the light having the second wavelength $\lambda 2$ is greater than the transmittance of another part of the filtering layer 7 located in the second region A2 for the light having the second wavelength $\lambda 2$. Exemplarily, the filtering layer 7 includes multiple first regions A1, the first fingerprint recognition module 61 includes multiple photodiodes, and the first regions A1 can correspond to the photodiodes in one-to-one correspondence. In some embodiments of the present disclosure, along the direction perpendicular to the plane of the substrate 1, an orthographic projection of the photodiode in the first fingerprint recognition module 61 on the plane of the filtering layer 7 at least partially located in the first region A1. With such a configuration, the reflection light reflected by the finger 6 is incident to the corresponding photodiode through the first region A1, so as to prevent the light reflected by different positions of the finger from being incident to a same photodiode, thus achieving the accuracy of fingerprint recognition.

In some embodiments, the filtering layer 7 includes a through hole H. The through hole H is located in the first region A1 to improve the transmittance of the light having the second wavelength $\lambda 2$ at this position.

As shown in FIG. 7, in some embodiments of the present disclosure, the through hole H located in the first region A1 can be opened in the first light-shielding unit 70.

Exemplarily, as shown in FIG. 7, the display panel includes an optical adhesive 10, and the optical adhesive 10 is located at a side of the filtering layer 7 facing away from the substrate 1 and covers the filtering layer 7. The through holes H can be filled with the optical adhesive 10.

Exemplarily, when the first light-shielding unit 70 is provided, in some embodiments of the present disclosure, the transmittance of the first light-shielding unit 70 for the light having the first wavelength $\lambda 1$ can be smaller than the transmittance of the first light-shielding unit 70 for the light having the second wavelength $\lambda 2$. In this way, the first light-shielding unit 70 can be block the light having the first wavelength $\lambda 1$ from passing through the first light-shielding unit 70. When the light having the first wavelength $\lambda 1$ is set as the visible light, the first light-shielding unit 70 is provided to absorb the visible light emitted from ambient environment to the inside of the display panel and the visible light reflected by the reflective structures such as the metal electrode in the display panel, thereby reducing the intensity of the reflected ambient light emitted from the display panel and thus being conducive to reducing the reflectivity of the entire panel. By selecting the first light-shielding unit 70 having a relatively large transmittance for the light having the second wavelength $\lambda 2$, when the light having the second wavelength $\lambda 2$ is selected to realize fingerprint recognition, the intensity of the light having the second wavelength emitted from the first fingerprint recognition light source 51 to the finger and the intensity of the light having the second wavelength reflected by the finger to the first fingerprint recognition module can be reduced to ensure the sensitivity and accuracy of fingerprint recognition.

Figure 8:
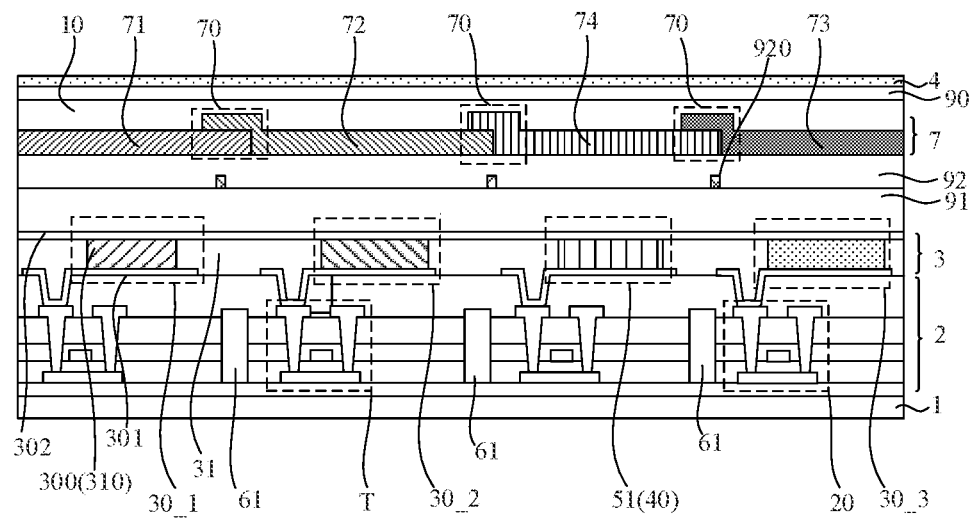
FIG. 8 is a cross-sectional view of another display panel according to some embodiments of the present disclosure.

Exemplarily, in some embodiments of the present disclosure, the first light-shielding unit 70 can include two color filter units of different colors that are stacked together. FIG. 8 is a cross-sectional view of another display panel according to some embodiments of the present disclosure. As shown in FIG. 8, the first light-shielding unit 70 is formed by stacking two color filter units adjacent to the first light-shielding unit 70. For example, a part of the first light-shielding unit 70 includes a first color filter unit 71 and a second color filter unit 72 that are stacked in the direction perpendicular to the plane of the substrate 1. Since the light emitted through the first color filter unit 71 cannot pass through the second color filter unit 72, there is no need to provide additional light shielding material while ensuring that the visible light cannot be emitted through the first light-shielding unit 70, which can reduce the complexity of the process of the display panel.

Due to the relatively small transmittance of light-shielding materials such as black resin or carbon black for the infrared light, color filters that are configured to transmit visible light in a certain band, such as a red color filter, a green color filter, and a blue color filter, have a relatively large transmittance for the infrared light. Therefore, by setting the first light-shielding unit 70 to include two color filters of different colors that are stacked together. The embodiments of the present disclosure can ensure the transmittance of the first light-shielding unit 70 for the infrared light while the transmittance of visible light is reduced. When the fingerprint recognition light source is set to the infrared light, the intensity of the infrared light received by the first fingerprint recognition module 61 can be guaranteed.

In some embodiments, referring to FIG. 7, the display panel includes a second light-shielding unit 80 located between the transistor and the first fingerprint recognition light source 51 along the direction perpendicular to the plane of the substrate 1. When the display panel performs fingerprint recognition, the light emitted from the first fingerprint recognition light source 51 will be blocked by the second light-shielding unit 80 in the process where the light emitted from the first fingerprint recognition light source 51 is incident to the transistor, so that the transistor can be prevented from being affected by the light having the second wavelength λ2, which is beneficial to prevent the characteristics of the transistor from being affected by light.

Exemplarily, as shown in FIG. 7 and FIG. 8, the display panel includes a cover plate 90, an encapsulation layer 91, and a touch layer 92. The encapsulation layer 91 is located between the anti-reflection film 4 and the display layer 3. Exemplarily, the encapsulation layer 91 can adopt thin film encapsulation technology. The encapsulation layer 91 includes an organic encapsulation layer and an inorganic encapsulation layer that are stacked together. The encapsulation layer 91 is provided to prevent water and oxygen from entering the light-emitting element, which improves the stability of the first light-emitting element 30.

The touch layer 92 is located at a side of the encapsulation layer 91 facing away from the substrate 1, and the touch layer 92 includes a touch electrode 920. Exemplarily, the touch electrode 920 includes metal or transparent metal oxide. In some embodiments, the touch electrodes 920 does not overlap with the first light-emitting layer 300 along the direction perpendicular to the plane of the substrate 1, so as to prevent the setting of the touch electrodes 920 from affecting the light-exiting of the first light-emitting layer 300. Exemplarily, the touch electrode 920 does not overlap with the first light-shielding unit 70 along the direction perpendicular to the plane of the substrate 1, so that the touch electrodes 920 is prevented from being observed by human eyes, thereby achieving the display effect of the display panel.

The cover plate 90 is located at a side of the anti-reflection film 4 facing the substrate 1. The anti-reflection film 4 can be coated on a surface of the cover plate 90 facing away from the substrate 1.

Figure 9:
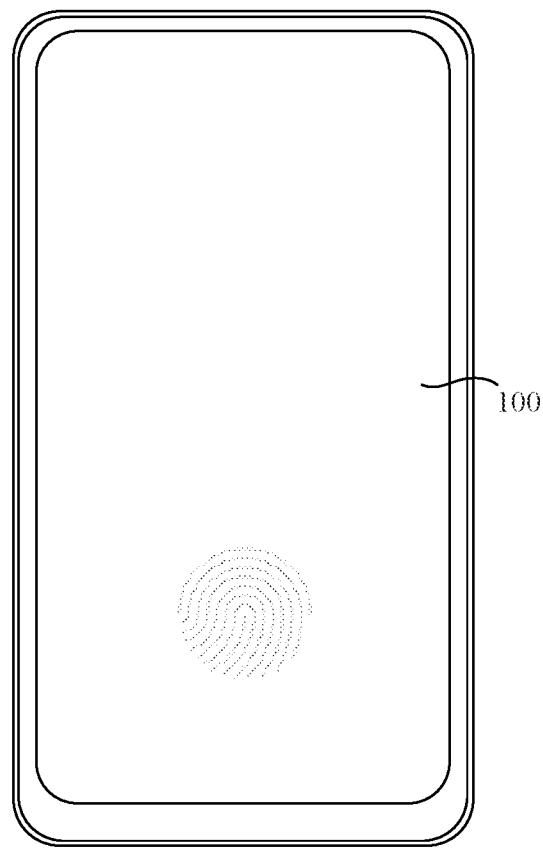
FIG. 9 is a top view of a display device according to some embodiments of the present disclosure.

Some embodiments of the present disclosure provide a display apparatus. FIG. 9 is a schematic top view of a display device according to some embodiments of the present disclosure. As shown in FIG. 9, the display apparatus includes the display panel 100. The structure of the display panel 100 has been described in detail in the above-mentioned embodiments, and will not be repeated herein. The display device shown in FIG. 9 is only a schematic illustration, and the display device can be any electronic device having a display function, such as a mobile phone, a tablet computer, a laptop computer, an electronic paper book, or a television.

Figure 10:
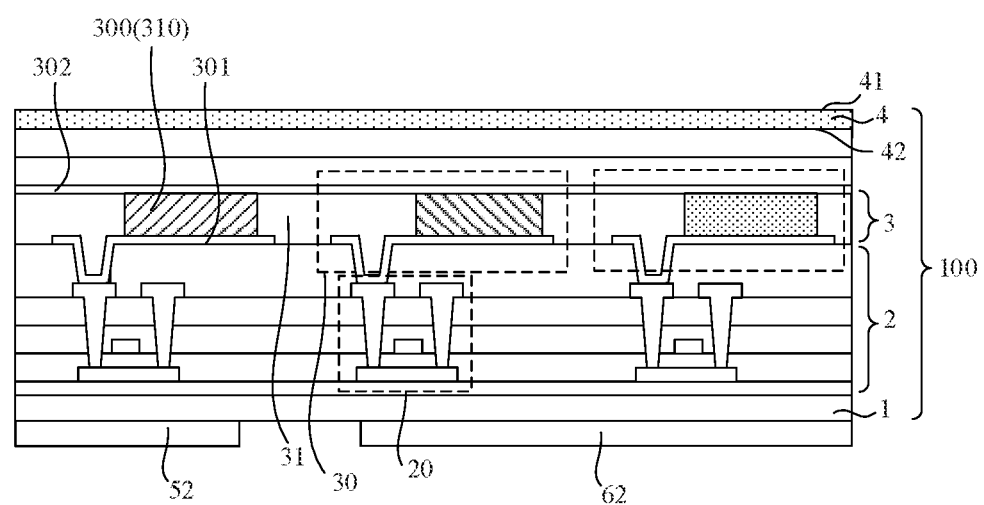
FIG. 10 is a cross-sectional view of a display device according to some embodiments of the present disclosure.

FIG. 10 is a cross-sectional view of a display device according to some embodiments of the present disclosure. In some embodiments, as shown in FIG. 10, the display apparatus includes a second fingerprint recognition light source 52 and a second fingerprint recognition module 62. In the direction perpendicular to the plane of the substrate 1, the second fingerprint recognition module 62 is located at a side of the substrate 1 facing away from the anti-reflection film 4. The second fingerprint recognition module 62 is configured to receive the light having the second wavelength λ2. The second fingerprint recognition light source 52 is configured to emit the light having the second wavelength λ2. When manufacturing the display device, in some embodiments of the present disclosure, the display panel 100, the second fingerprint recognition module 62, and the second fingerprint recognition light source 52 can be formed independently, and then are assembled together.

Exemplarily, in some embodiments of the present disclosure, the second fingerprint recognition light source 52 and the second fingerprint recognition module 62 can be provided at a same side of the display panel 100. As shown in FIG. 10, in some embodiments of the present disclosure, the second fingerprint recognition light source 52 and the second fingerprint recognition module 62 can be provided at a side of the display panel 100 facing away from the light-exiting side.

In other embodiments of the present disclosure, the display panel 100 can be provided between the second fingerprint recognition light source 52 and the second fingerprint recognition module 62. For example, in some embodiments of the present disclosure, the second fingerprint recognition module 62 can be provided at a side of the display panel 100 facing away from the light-exiting side, and a frame of the second fingerprint recognition light source 52 close to the display panel 100 is provided at the light-exiting side of the display panel 100.

The above are merely some embodiments of the present disclosure, which, as mentioned above, are not intended to limit the present disclosure. Within the principles of the present disclosure, any modification, equivalent substitution, improvement shall fall into the protection scope of the present disclosure.

What is claimed is:

1. A display panel, comprising:
    an anti-reflection film located at a light-exiting side of the display panel,
    wherein a reflectivity of the anti-reflection film for light having a first wavelength is smaller than a reflectivity of the anti-reflection film for light having a second wavelength, the first wavelength is different from the second wavelength, the light having the first wavelength is any one of light in ambient light outside the display panel, and the light having the second wavelength is light emitted by a first fingerprint recognition light source located inside the display panel; and
    the light having the second wavelength reflected by a first surface of the anti-reflection film and the light having the second wavelength reflected by a second surface of the anti-reflection film do not satisfy interference cancellation condition, the first surface being opposite to the second surface; and/or
    the first wavelength $\lambda 1$ satisfies: 400 nm<$\lambda 1$<700 nm; and the second wavelength $\lambda 2$ satisfies: $\lambda 2 \geq 700$ nm, or $\lambda 2 \leq 400$ nm.

2. The display panel according to claim 1, further comprising:
    a filtering layer; and
    a first fingerprint recognition module configured to receive the light having the second wavelength, wherein the filtering layer is located between the anti-reflection film and the first fingerprint recognition module in a direction perpendicular to a plane of the display panel.

3. The display panel according to claim 2, wherein the filtering layer comprises a first region and a second region, wherein a transmittance of the first region for the light having the second wavelength is greater than a transmittance of the second region for the light having the second wavelength.

4. The display panel according to claim 3, wherein the first region comprises a through hole.

5. The display panel according to claim 2, wherein the filtering layer comprises a first color filter unit, a second color filter unit and a first light-shielding unit; and
    the first light-shielding unit is located between the first color filter unit and the second color filter unit in a direction parallel to the plane of the display panel, and a transmittance of the first light-shielding unit for the light having the first wavelength is smaller than a transmittance of the first light-shielding unit for the light having the second wavelength.

6. The display panel according to claim 5, wherein the first light-shielding unit comprises the first color filter unit and the second color filter unit that are stacked in the direction perpendicular to the plane of the display panel.

7. The display panel according to claim 1, further comprising:
    an array layer comprising a plurality of transistors, and
    a second light-shielding unit located between the plurality of transistors and the first fingerprint recognition light source in a direction perpendicular to a plane of the display panel.

8. The display panel according to claim 1, further comprising:
    a display unit comprising a first light-emitting element, wherein the first fingerprint recognition light source is located at a side of the first light-emitting element facing the anti-reflection film or located at a side of the first light-emitting element facing away from the anti-reflection film.

9. The display panel according to claim 1, further comprising:
    a pixel definition layer comprising a plurality of first openings and a second opening; and
    a display unit comprising a first light-emitting element, wherein the first light-emitting element comprises a first light-emitting layer located in the plurality of first openings, the fingerprint recognition light source comprises a second light-emitting element comprising a second light-emitting layer, and the second light-emitting layer is located in the second opening.

10. The display panel according to claim 9, wherein the first light-emitting layer has a density greater than or equal to the second light-emitting layer.

11. The display panel according to claim 9, further comprising:
    a first pixel driving circuit electrically connected to the first light-emitting element; and
    a second pixel driving circuit electrically connected to the second light-emitting element,
    wherein both the first pixel driving circuit and the second pixel driving circuit comprise a plurality of transistors, and a number of the plurality of transistors in the first pixel driving circuit is greater than or equal to a number of the plurality of transistors in the second pixel driving circuit.

12. The display panel according to claim 1, wherein the anti-reflection film comprises a metal fluoride.

13. The display panel according to claim 1, wherein $\lambda 1 = 550$ nm.

14. The display panel according to claim 1, wherein the anti-reflection film has a refractive index n and a thickness d, which satisfy: $n \times d = \lambda 1 \times (1/4 + k/2)$, where k is an integer.

15. The display panel according to claim 1, wherein the reflectivity R1 of the anti-reflection film for the light having the first wavelength and the reflectivity R2 of the anti-reflection film for the light having the second wavelength satisfy $(R2-R1)/R1 \geq 5$.

16. A display apparatus, comprising a display panel, wherein the display panel comprises an anti-reflection film located at a light-exiting side of the display panel, a reflectivity of the anti-reflection film for light having a first wavelength is smaller than a reflectivity of the anti-reflection film for light having a second wavelength, the first wavelength is different from the second wavelength, the light having the first wavelength is any one of light in ambient light outside the display panel, and the light having the second wavelength is light emitted by a first fingerprint recognition light source located inside the display panel; and
    the light having the second wavelength reflected by a first surface of the anti-reflection film and the light having the second wavelength reflected by a second surface of the anti-reflection film do not satisfy interference cancellation condition, the first surface being opposite to the second surface; and/or
    the first wavelength $\lambda 1$ satisfies: 400 nm<$\lambda 1$<700 nm; and the second wavelength $\lambda 2$ satisfies: $\lambda 2 > 700$ nm, or $\lambda 2 \leq 400$ nm.

17. The display apparatus according to claim 16, further comprising:
    a first fingerprint recognition light source; and
    a second fingerprint recognition module,
    wherein the second fingerprint recognition module located at a side of the anti-reflection film away from the light-exiting side of the display panel in a direction perpendicular to the plane of the display panel, wherein the second fingerprint recognition module is configured to receive the light having the second wavelength, and the second fingerprint recognition light source is configured to emit the light having the second wavelength; and the display panel is located between the second fingerprint recognition light source and the second fingerprint recognition module, or the second fingerprint recognition light source and the second fingerprint recognition module are located at a same side of the display panel.

18. The display panel according to claim 1, wherein the display panel further comprises a substrate, an array layer, and a display layer, in a direction perpendicular to a plane of the substrate, the array layer is located at a side of the substrate, the display layer is located at a side of the array layer facing away from the substrate, and the anti-reflection film is located at a side of the display layer facing away from the substrate.

19. The display panel according to claim 16, wherein the display panel further comprises a substrate, an array layer, and a display layer, in a direction perpendicular to a plane of the substrate, the array layer is located at a side of the substrate, the display layer is located at a side of the array layer facing away from the substrate, and the anti-reflection film is located at a side of the display layer facing away from the substrate.

* * * * *